United States Patent [19]

Berthold et al.

[11] 4,234,077
[45] Nov. 18, 1980

[54] EQUIPMENT FOR REMOVING BULK MATERIAL FROM A DUMP

[75] Inventors: Heinz Berthold, St. Ingbert-Rohrbach; Karl E. Zimmer, Eiweiler, both of Fed. Rep. of Germany

[73] Assignee: Pohlig-Heckel-Bleichert Vereinigte Maschinenfabriken Aktiengesellschaft, Koln-Zollstock, Fed. Rep. of Germany

[21] Appl. No.: 961,094

[22] Filed: Nov. 16, 1978

[51] Int. Cl.³ .............................................. B65G 17/36
[52] U.S. Cl. .................................... 198/712; 198/713
[58] Field of Search .............. 198/509, 703, 708, 711, 198/712, 713, 714, 717, 725, 734; 37/191 R, 191 A, 192 R, 192 A

[56] References Cited
FOREIGN PATENT DOCUMENTS
1756021 4/1972 Fed. Rep. of Germany.
2155355 1/1977 Fed. Rep. of Germany.

Primary Examiner—James L. Rowland
Attorney, Agent, or Firm—Fitzpatrick, Cella, Harper & Scinto

[57] ABSTRACT

Apparatus for removing bulk material from dumps, mixed-bed installations or the like. The apparatus includes two horizontally spaced apart, parallel endless roller chains which have side bars and form substantially horizontal upper and lower courses. The chains are driven so that the lower courses move in a predetermined horizontal direction. A plurality of carrying elements are disposed between the chains, each carrying element comprises a frame secured to both chains at respective side bars thereof and a bottom secured to the lower courses to protrude from the frame substantially horizontally opposite to the predetermined horizontal direction and close to the bottom of the next adjacent carrying element. The frame and bottoms of the carrying elements define spaces which are open on both sides.

10 Claims, 4 Drawing Figures

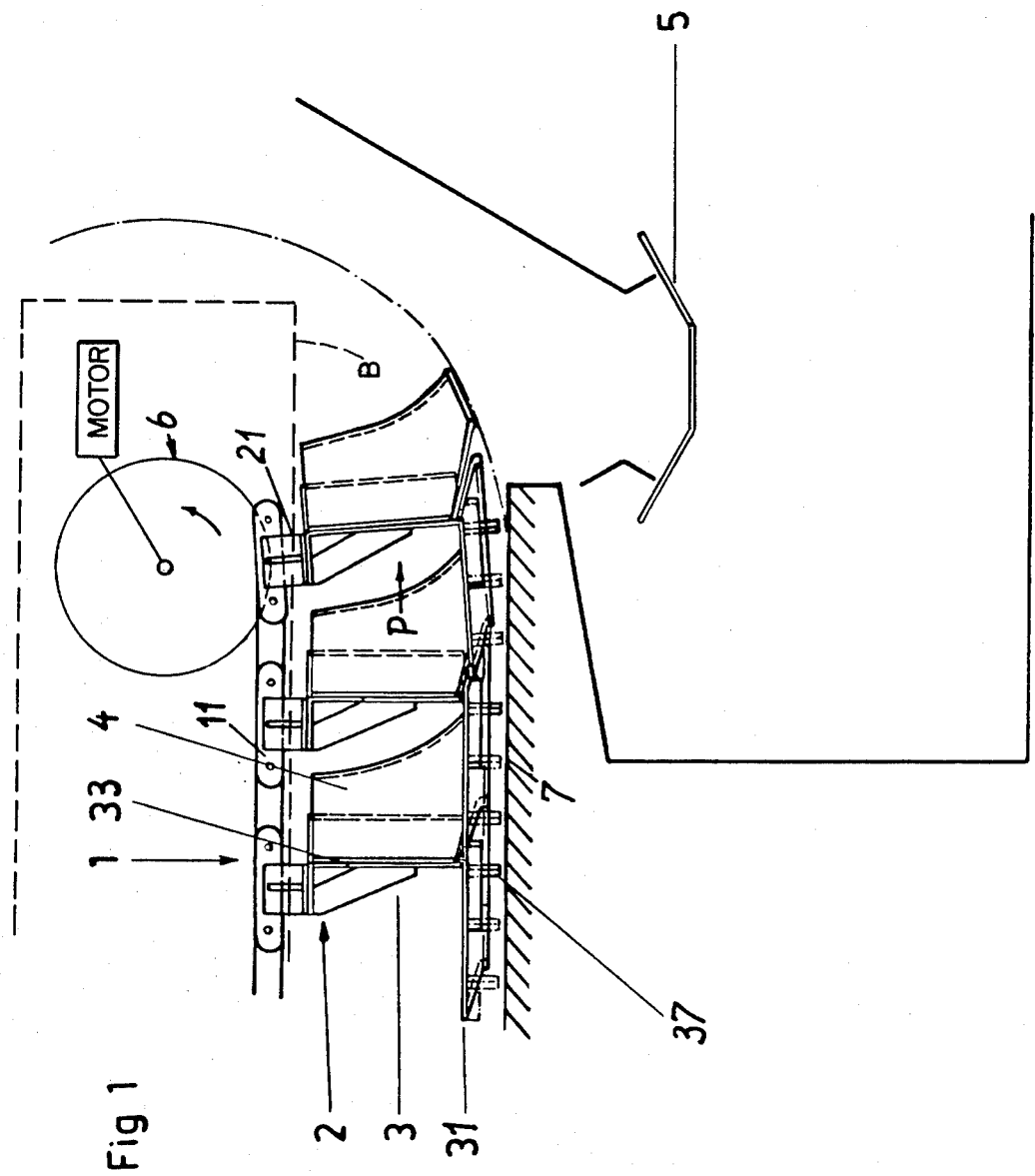

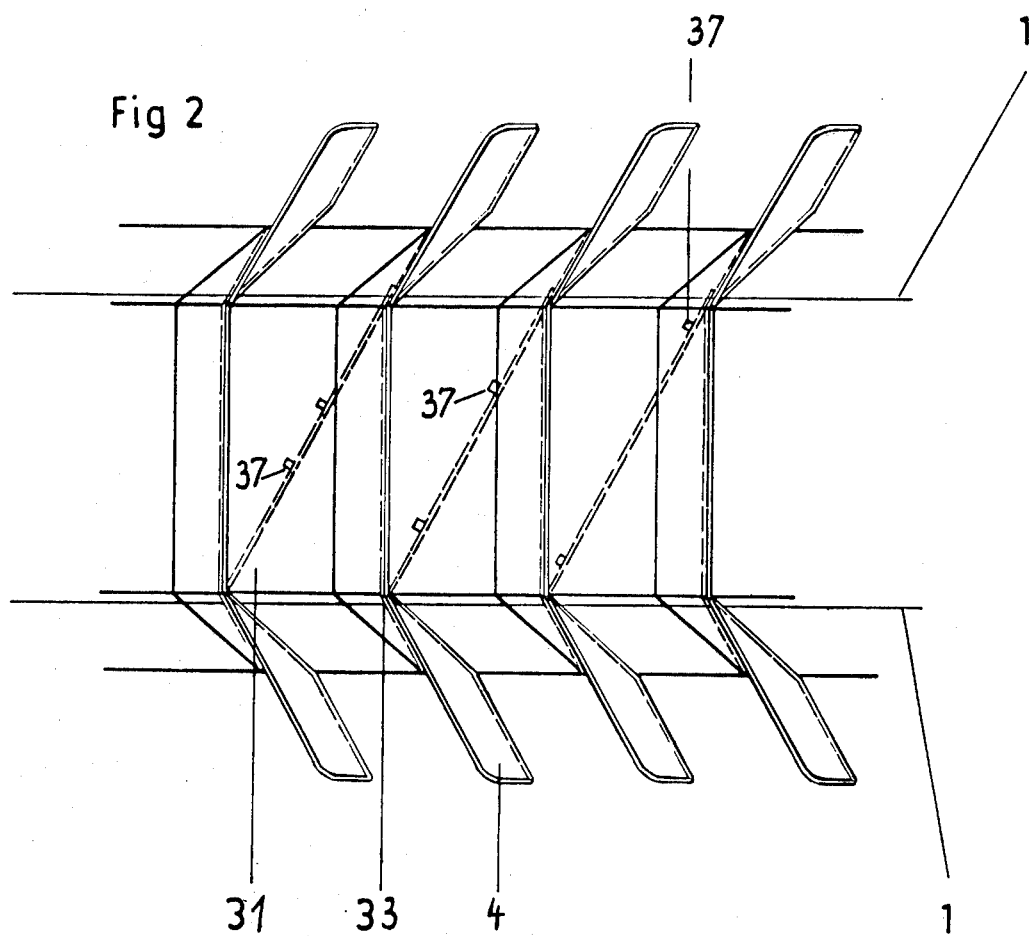
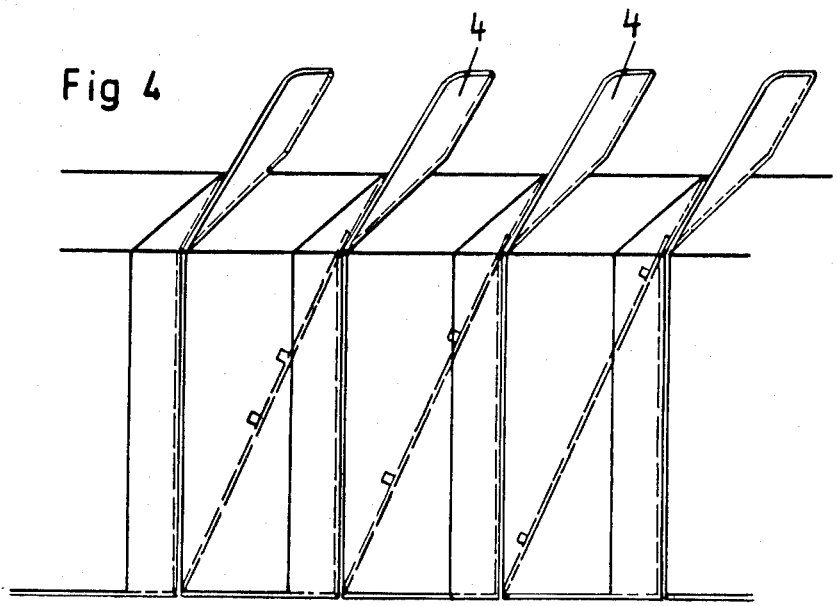

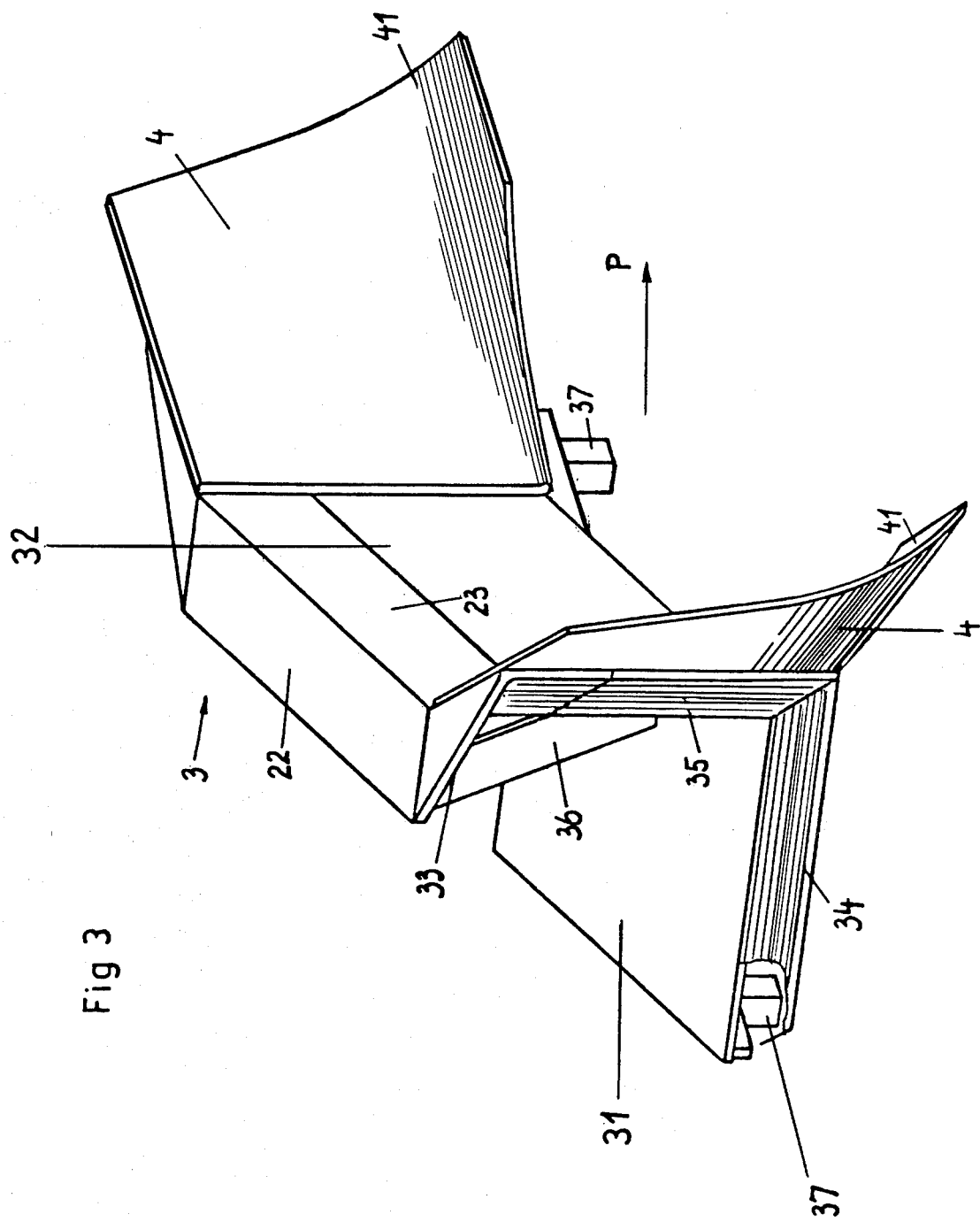

EQUIPMENT FOR REMOVING BULK MATERIAL FROM A DUMP

BACKGROUND OF THE INVENTION

The present invention relates generally to equipment for removing bulk material from dumps, mixed-bed installations or the like, comprising a bridge which traverses the dump and is movable in the longitudinal direction of the dump, and a withdrawing conveyor, which is carried by and fixed to the bridge and includes two revolving parallel endless roller chains having upper and lower courses which are parallel to the longitudinal direction to the bridge, and material-handling elements secured to said roller chains at spaced apart points.

Bulk materials having widely varying particle sizes may be stored temporarily or for substantial times in mixed-bed installations or other dumps.

Equipment of known types for removing material from such dumps comprises a bridge, which is provided with means for removing material from the dump. Such means may comprise a scraper (German Patent Specification No. 2,155,355) or a bucket tube (German Patent Publication No. 1,756,021) or a frame, which rotates about the bridge and is provided with knife edges spaced along the frame (German Utility Model Specification 7,000,092).

Such equipment is suitable for handling bulk material consisting of relatively hard particles but cannot be used for removing bulk material which is abradable and/or very small in particle size. In the handling of such bulk materials, such as coal, fertilizer or the like, any tumbling of the bulk material must be avoided as far as possible. This requirement is not fulfilled by the equipment of known types. For instance, in the known equipment comprising bucket wheels or bucket tubes the bulk material is raised and subsequently falls down to a lower level. This results in an abrading or undesired disintegration of the particles and even dust may be raised in considerable quantities.

It is an object of this invention to provide equipment for removing material from dumps or mixed-bed installations or the like without adversely affecting such material.

SUMMARY OF THE INVENTION

In accordance with the present invention, a withdrawing conveyor comprises carrying elements, each of which has a frame, which is rigidly connected to a side bar of each of two roller chains, and a substantially horizontal bottom, which protrudes from the frame opposite to the direction of travel of the chains, the bottoms of adjacent carrying elements secured to the lower course of the roller chains substantially adjoin each other, and the spaces between adjacent carrying elements are accessible from the sides. In the operation of such equipment, the bulk material is uniformly withdrawn from the base of the dump and is not tumbled at all while resting on the bottom of the carrying elements. While moving along the straight lower courses of the roller chains, the bottoms form a virtually continuous, moving platform carrying the bulk material. The frames of adjacent carrying elements define between them a space which is defined underneath by the bottom of the leading carrying element and is accessible from the side so that the bulk material can flow freely onto the bottoms of the carrying elements. In a preferred embodiment, the frame of each carrying element comprises a rear wall which has a lower edge disposed at the bottom of the same carrying element. In that embodiment the spaces between adjacent carrying elements are separated from each other by the rear walls to form cells. The spaces between adjacent frames may also be described as cells if the frames do not comprise rear walls because in that case too, the spaces are distinctly separated by the frames. A guide wall is secured to each frame at least on one side thereof and has a lower edge close to the bottom extending from the frame obliquely outwardly and in the direction opposite to the bottom of the same carrying element. Such guide wall preferably has a lower edge portion which is inclined from the plane of the bottom.

Equipment according to the invention may be used to remove bulk material from elongated, straight dumps or from circular dumps. In both cases the equipment removes material from an end face of the dump. Numerous dump installations comprise two or more straight dumps, which are aligned with each other and from which material is desirably removed at end faces facing each other by common equipment. In that case, equipment according to the invention which is placed between adjacent end faces of adjacent dumps desirably comprises carrying elements provided with guide walls on both sides of their frames. On the other hand, equipment for removing material from circular dumps always removes material only from one end face of the dump. In such case it is sufficient to provide the frame of each carrying element with a guide wall only on its side facing said end face of the dump.

In equipment for removing material from straight dumps, the frame of each carrying element is desirably provided with two guide walls which protrude from opposite sides of the frame and are symmetrically arranged and shaped with respect to the longitudinal center plane of the frame. In equipment for removing material from circular dumps, each carrying element desirably comprises only one guide wall, which protrudes from one side of the frame, and the cell spaces between adjacent carrying elements are oblique to the longitudinal axis of the bridge. The guide walls promote the gentle transfer of the bulk material which has been scraped off to the bottoms of the carrying elements and the uniform filling of the cell spaces. The bottoms of the carrying elements may be spaced from the ground adjacent to the dump so that they will not be prematurely worn due to contact with the ground. For that purpose, each bottom may be provided on the underside with projections for supporting the bottom on the ground adjacent to the dump. In such an arrangement the roller chains need not carry the loaded carrying elements and the wear is restricted to the projections, which can easily be replaced. By means of these projections, a predetermined, small spacing between the bottoms of the carrying elements and the ground adjacent to the dump is maintained because the projections loosen any bulk material remaining on the ground adjacent to the dump and thus prevent the formation of a layer of bulk material in that area.

There has thus been outlined rather broadly the more important features of the invention in order that the detailed description thereof that follows may be better understood, and in order that the present contribution in the art may be appreciated. There are, of course, additional features of the invention that will be described hereinafter. Those skilled in the art will appreciate that the construction on which this disclosure is based may readily be utilized as the basis for the designing of other structures for carrying out several purposes of the invention. It is important, therefore, that this disclosure be regarded as including such equivalent constructions as do not depart from the spirit and scope of the invention.

Certain specific embodiments of the invention have been chosen for purposes of illustration and description and are shown in the accompanying drawings forming a part of the specification, wherein:

FIG. 1 is a side elevation showing equipment embodying the invention;

FIG. 2 is a top plan view showing part of the conveyor which comprises carrying elements;

FIG. 3 is a perspective view showing a special embodiment of the carrying elements; and FIG. 4 shows part of a conveyor of equipment according to the invention for removing material from a circular dump.

DESCRIPTION OF THE INVENTION

The equipment shown in FIG. 1 comprises a bridge B, which is movable in the longitudinal direction of a dump. For removing material from straight dumps, the bridge is movable on rails which are parallel to the dump. For removing material from a circular dump, the bridge is pivotally movable about the center of the dump. In both cases the bridge can be positioned near an end face of the dump. A conveyor is carried by and fixed to the bridge and comprises two endless roller chains 1, each of which is trained around two spiders mounted near respective ends of the bridge. One of said spiders is indicated by a circle and designated with the reference character 6. The two roller chains are identical and have straight upper and lower courses extending parallel to the longitudinal axis of the bridge. Carrying elements 3 are secured to the roller chains at spaced apart points. Each carrying element 3 comprises a frame 2, which is secured by a connecting element 21 to two horizontally aligned side bars 11 of respective chains 1. A bottom 31 extends from the frame of each carrying element substantially opposite to the direction of travel. The bottoms of the carrying elements secured to the lower courses of the chains extend substantially horizontally and are closely spaced above the ground. The direction of travel of the lower course is indicated by an arrow "P".

A preferred embodiment of a carrying element 3 is shown in FIG. 3. The frame 2 comprises a rear wall 32, which has a lower edge joined to the bottom 31. The bottom has a flat intermediate portion and is provided on both sides with depending inclined flanges 34. The rear wall 32 has also a flat intermediate portion, which is adjoined at the top and on both sides by inclined flanges 33 and 35, respectively. The inclined top flange 33 protrudes generally in the same direction as the bottom. The inclined side flanges 35 are angled toward the direction of travel. A top member having the shape of an inverted V in cross-section is mounted on the inclined top flange and comprises legs 22, 23, which together with the inclined top flange 33 constitute a hollow beam. The connecting element 21 (FIG. 1) is secured to the upper leg 22. The integrity of the structure is maintained by two struts 36, which are provided between the transverse beam 22, 23, 33 and the rear wall. An oblique guide wall 4 is secured to each of the two inclined side flanges 35 of the rear wall. Each of these two guide walls extends from the rear wall laterally and in the direction of travel and has a lower edge portion 41, which is inclined toward the ground 7 adjacent to the dump and toward the other guide wall. The entire carrying element is symmetrical with respect to its longitudinal center plane so that it makes no difference on which side the dump end face is disposed from which material is to be removed. Projections 37 protrude from the underside of the bottom 31 and engage the ground 7 adjacent to the dump and thus reduce the wear of the bottom.

FIG. 2 shows a conveyor which has carrying elements provided with guide walls 4 on both sides. FIG. 4 shows a portion of a conveyor having carrying elements provided with guide walls 4 only on one side.

Carrying elements having only one guide wall are lighter in weight and less expensive than carrying elements having two lateral guide walls but can be used only at dump end faces disposed on that side of the carrying elements on which the guide walls are provided. This does not mean a restriction in connection with circular dumps, from which material is removed in any case only at one end face. In that case the equipment will be mounted so that the guide walls are on the same side as said end face. In conveyors having carrying elements which receive material only from one side it may be recommendable to so design the carrying elements that the transverse axis of each cell space between adjacent carrying elements includes an acute rather than a right angle with reference to the direction of travel. This design may result in an increase of the quantity of bulk material which can be received on the bottom of each carrying element.

The mode of operation of equipment according to the invention is very simple. When the lower course of the conveyor is moving in the direction in which material is to be withdrawn, indicated by the arrow P, the spiders revolve in the counterclockwise sense. The bulk material which has been scraped from the dump end face and is disposed near the base of said end face is received in the spaces between adjacent carrying elements from the side. This reception is promoted by the guide walls. The bulk material which has been received rests on the bottoms of the carrying elements. These bottoms are closely spaced to constitute virtually a moving platform, which supports the bulk material so that the latter is not tumbled as it is conveyed. When the carrying elements, which are generally L-shaped in longitudinal section, arrive adjacent to the spider 6, the frames are pivotally moved around the axis of the spider and during said pivotal movement extend substantially radially whereas the bottoms protrude rearwardly. As a result, the bulk material slides from said bottom and falls onto a succeeding conveyor 5 (FIG. 1). During that transfer of the bulk material, the latter is not tumbled and is handled carefully because it falls only over a small distance. It is apparent that a rubbing of the particles of the bulk material on each other is substantially avoided so that the abrasion and disintegration of such particles is minimized or even prevented.

What is claimed is:

1. A conveyor for removing bulk material from a base portion of an end face of a dump, comprising:
    two horizontally spaced apart, parallel endless roller chains forming substantially horizontal upper and lower courses;

drive means for revolving said chains to move in a predetermined horizontal direction of travel along said lower courses; and a plurality of adjacent carrying elements each comprising a frame which extends transversely between and is connected to each of said endless chains, and a bottom which extends substantially horizontally from the lower end of said frame in the opposite direction to said predetermined direction of travel, said carrying elements being constructed and arranged to permit free passage of bulk material laterally into carrying spaces each defined by the frame of a first carrying element and the bottom of an adjacent carrying element 2. A conveyor as set forth in claim 1, wherein said conveyor is movable transversely to said predetermined direction.

3. A conveyor as set forth in claim 2, further comprising a bridge which carries said chains, wherein said bridge extends in said predetermined direction and is movable transversely thereto.

4. A conveyor as set forth in claim 1, wherein said frame of each of said carrying elements comprises a rear wall which has a lower edge portion disposed close to the bottom of the same carrying element.

5. A conveyor as set forth in claim 1, wherein each of said carrying elements comprises at least one oblique guide wall which is secured to one side of the frame of said carrying element and has a lower edge portion adjacent to the bottom of said carrying element, and wherein said guide wall extends from said frame laterally outwardly with respect to said predetermined direction of travel.

6. A conveyor as set forth in claim 5, wherein said lower edge portion of each said guide wall is inclined inwardly toward the plane of the bottom of its associated carrying element.

7. A conveyor as set forth in claim 1, wherein each of said carrying elements comprises two oblique guide walls which are respectively secured to the opposite sides of the frame of said carrying element, each of said two guide walls having a lower edge portion adjacent to the bottom of said carrying element, and wherein each of said two guide walls extends from the frame of said carrying element laterally outwardly with respect to said predetermined direction of travel.

8. A conveyor as set forth in claim 7, wherein said two guide walls of each of said carrying elements are symmetrically arranged and shaped with respect to the longitudinal center plane of the frame of the same said carrying element.

9. A conveyor as set forth in claim 5, wherein each of said carrying elements comprises only one guide wall and wherein said spaces are oblique with respect to the longitudinal direction of said chains.

10. a conveyor as set forth in claim 1, wherein said bottoms of said carrying elements are close to the ground when they extend along the lower courses, and wherein each of said carrying elements further comprises support means which protrude from the underside of its bottom to engage the ground.

* * * * *